United States Patent [19]

Schauwecker

[11] Patent Number: 4,849,860
[45] Date of Patent: Jul. 18, 1989

[54] BALL-AND-SOCKET MOUNTING OF A REFLECTOR ON MOTOR VEHICLE HEADLIGHT FRAMES

[75] Inventor: Friedrich Schauwecker, Pfullingen, Fed. Rep. of Germany

[73] Assignee: Robert Bosch GmbH, Stuttgart, Fed. Rep. of Germany

[21] Appl. No.: 220,277

[22] Filed: Jul. 18, 1988

[30] Foreign Application Priority Data

Aug. 22, 1987 [DE] Fed. Rep. of Germany ........ 3728121

[51] Int. Cl.⁴ .............................................. B60Q 1/04
[52] U.S. Cl. ...................................... 362/61; 362/284; 362/289; 362/324; 362/421
[58] Field of Search ..................... 362/61, 66, 80, 269, 362/273, 282, 284, 289, 322, 324, 418, 421, 429

[56] References Cited

U.S. PATENT DOCUMENTS

| | | | |
|---|---|---|---|
| 4,318,161 | 3/1982 | Shanks | 362/61 X |
| 4,471,413 | 9/1984 | Dick | 362/421 X |
| 4,757,428 | 7/1988 | Ryder et al. | 362/421 X |

*Primary Examiner*—Stephen F. Husar
*Attorney, Agent, or Firm*—Edwin E. Greigg

[57] ABSTRACT

A bushing made of elastic plastic, spherically receives a ball pivot of an adjusting screw and is fixed in a socket which protrudes from a back side of a reflector. Two spring clips of the bushing grip two catches of the socket from behind, and two rails of the hollow journal cooperate with two slot links of the frame. This ball-and-socket mounting, which is coaxial with respect to the adjusting screw can be assembled by robots and does not cause any bending moments that unfavorably affect the reflector mounting.

16 Claims, 1 Drawing Sheet

BALL-AND-SOCKET MOUNTING OF A REFLECTOR ON MOTOR VEHICLE HEADLIGHT FRAMES

BACKGROUND OF THE INVENTION

The invention relates to a ball-and-socket mounting of a reflector on the motor vehicle headlight frames as generically defined hereinafter. In manufactured mountings of this kind, a catch securing the bushing to the reflector is disposed laterally of the adjusting screw. This lateral disposition produces a bending moment acting upon the catch and in particular on the internal thread of the frame; as a result, loosening of the catch and sluggish operation of the internal thread cannot be precluded.

OBJECT AND SUMMARY OF THE INVENTION

With the ball-and-socket mounting of a reflector on motor vehicle headlight frames according to the invention, the problem of the prior art as discussed above is solved in a technologically simple manner and with reliable function. By locking the bushing coaxially with respect to the adjusting screw and guiding it coaxially with a slot link, the catch and the internal thread are stressed only axially, so that bending moments acting upon them are avoided.

Advantageous further features of the invention include the tilt-proof fixation of the bushing on the back side of the reflector. In a further provision of the invention, shear forces are absorbed by the catch. A way of obtaining a simply manufactured adjustable slot link guidance is disclosed, as well as a means of definitively locking the catch.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
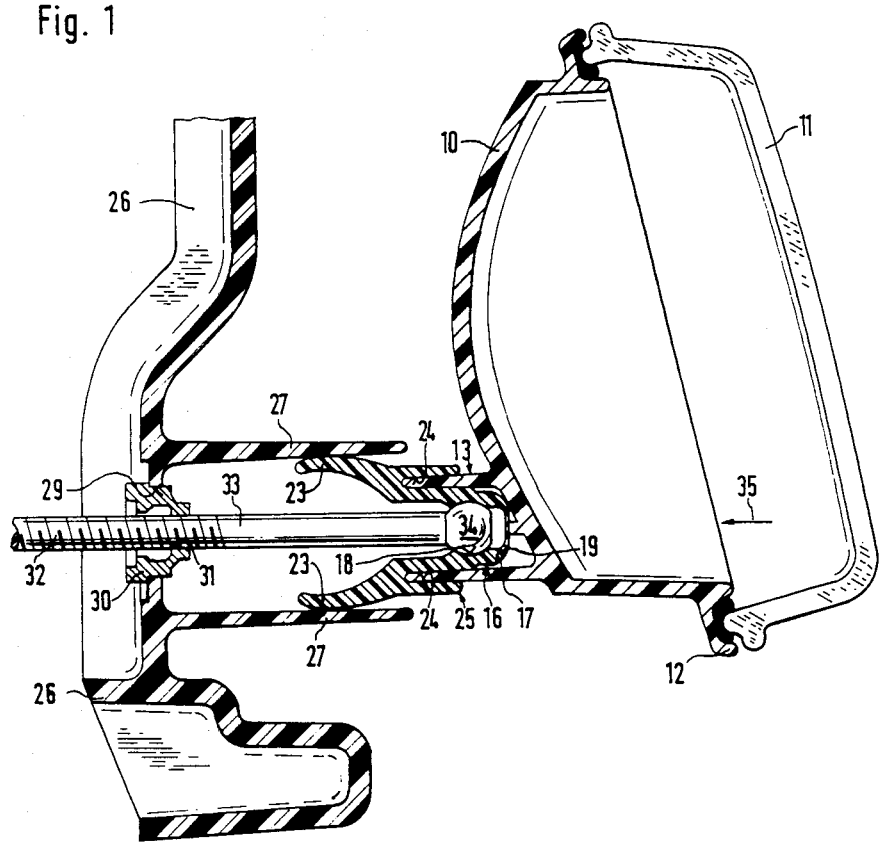
FIG. 1 shows one of three ball-and-socket mountings of a reflector of a headlight housing for motor vehicles in a fragmentary vertical section with respect to an adjusting screw.

FIG. 1 shows the reflector 10 of a motor vehicle headlight (having an incandescent bulb, not shown) and its scattering plate 11 which is glued into the reflector flange 12. An integral socket 13 acting as a guide element protrudes from the back side of the reflector 10 and is provided with two diametrically opposed catches 14, 14 the bearing face 15 of each catch facing toward the reflector 10.

A bushing 16 made of elastic plastic has a hollow journal 17 forming a spherical segment 18, protruding outward from the end face of which is a transverse shackle 19. Two integral tabs 20, disposed diametrically opposite one another, protrude outward from the end face of the hollow journal 17. Each tab 20 is embodied as a spring clip oriented outward and toward the reflector 10, with a recess 21 of U-shaped cross section, which on the end forms an axial shoulder 22. Offset by 90° from both spring clips 20, two rails 23 protrude at the end from the hollow journal 17, and in the vicinity of these rails 23 the hollow journal 17 has a groove 24, the inside member of which forms the hollow journal 17 and the outer member of which forms a flange 25 of the bushing 16.

A frame 26 shown only fragmentarily is secured to the body of the vehicle, not shown, and on the side oriented toward the reflector 10 has two slot links 27 parallel to one another; each slot link is embodied as a groove element 28 of U-shaped cross section. A nut 30 is secured in detent fashion in an opening 29 of the frame 26, the internal thread 31 of the nut cooperating with a threaded bolt 32 of an adjusting screw 33, the end portion of which is embodied as a ball pivot 34.

Figure 2:
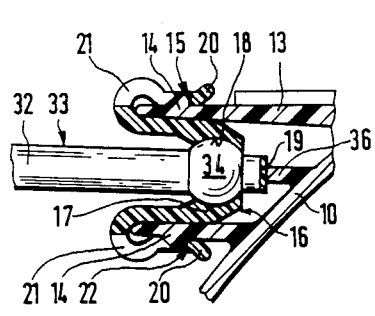
FIG. 2 is a fragmentary horizontal section in the vicinity of the bushing rotated 90° from the showing in FIG. 1.
Figure 3:
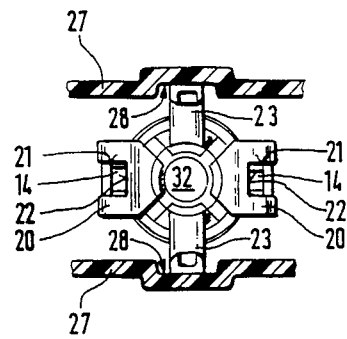
FIG. 3 is a back view of the ball-and-socket held in a modified mounting.

The above-described ball-and-socket mounting of the reflector 10 on the frame 12 is accomplished as follows:

The adjusting screw 33 is rotated into the nut 30 locked in detent fashion in the frame 26, and its ball pivot 34 is snapped into the spherical segment 18 of the hollow journal 17 of the bushing 16. After that, the reflector 10, with the scattering plate 11, is displaced in the direction of the arrow 35, so that the front edge of the socket 13 engages the groove 24 of the hollow journal 17, and the transverse shackle 19 (FIG. 2) is supported on a protuberance 36 on the back side of the reflector 10. In this position, both spring clips 20 lock into place behind the catches 14, so that as a result, the bushing 16 along with the adjusting screw 33 is fixed both axially and radially with respect to the reflector 10. At the same time, each rail 23 has been slipped into the associated groove element 23, thus providing a slot link guidance.

By means of this ball-and-socket mounting, the reflector 10 is axially displaceably supported at one point; such a mounting is also provided at a second point. Furthermore, by means of this ball-and-socket mounting, a so-called fixed bearing is formed at a third point by the provision that the threaded bolt 32 of the adjusting screw 33 is locked in the nut 30. By means of this three-point mounting, the reflector 10 is adjustable both horizontally and vertically.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A ball-and-socket mounting of a reflector on motor vehicle headlight frames, having the following characteristics:

a bushing of elastic material is secured to the back side of the reflector by means of a catch;

a ball pivot of an adjusting screw having a threaded portion is spherically mounted in the bushing, the threaded portion of the adjusting screw cooperates with an internal thread of a frame to which the reflector is mounted, said bushing (16) includes a hollow journal (17) having on its face end at least two rails (23) and at least two tabs (20), each of said rails and tabs have an axial shoulder (22), wherein both rails (23) and both tabs (20) are disposed diametrically opposite each other and have the same angular spacing, a guide element (13), on a back side of said reflector which receives said hollow journal (17), said guide element protrudes from the back side of the reflector (10) and includes two outer catches (14) which are supported on said axial shoulders (22), and said rails (23) cooperate with said frame (26) in the manner of a slot link (27).

2. A mounting as defined by claim 1, in which:

said guide element is a socket (13), including an outer jacket from which said catches (14) protrude and includes a front edge which in a vicinity of said rails (23), engages a groove (24) of said hollow journal (17) of said bushing (16).

3. A mounting as defined by claim 1, in which:

each of said tabs are embodied as a spring clip (20) and is oriented toward said reflector (10) and has a recess (21) of U-shaped cross section which receives said catch (14) behind an axial shoulder (22) on its end.

4. A mounting as defined by claim 2, in which:

each of said tabs are embodied as a spring clip (20) and is oriented toward said reflector (10) and has a recess (21) of U-shaped cross section which receives said catch (14) behind an axial shoulder (22) on its end.

5. A mounting as defined by claim 1, in which:

each of said slot link (27) of said frame (26) is a groove element (28) of U-shaped cross section including a groove bottom which is oriented away from said adjusting screw (31).

6. A mounting as defined by claim 2, in which:

each of said slot link (27) of said frame (26) is a groove element (28) of U-shaped cross section including a groove bottom which is oriented away from said adjusting screw (31).

7. A mounting as defined by claim 3, in which:

each said slot link (27) of said frame (26) is a groove element (28) of U-shaped cross section including a groove bottom which is oriented away from said adjusting screw (31).

8. A mounting as defined by claim 4, in which:

each said slot link (27) of said frame (26) is a groove element (28) of U-shaped cross section including a groove bottom which is oriented away from said adjusting screw (31).

9. A mounting as defined by claim 1, which includes:

a transverse shackle (19) that protrudes outwardly from an end face of said socket (13) of said bushing (16), and said transverse shackle (19), is supported on a protuberance (36) on said back side of said reflector (10).

10. A mounting as defined by claim 2, which includes:

a transverse shackle (19) that protrudes outwardly from an end face of said socket (13) of said bushing (16), and said transverse shackle (19), is supported on a protuberance (36) on said back side of said reflector (10).

11. A mounting as defined by claim 3, which includes:

a transverse shackle (19) that protrudes outwardly from an end face of said socket (13) of said bushing (16), and said transverse shackle (19), is supported on a protuberance (36) on said back side of said reflector (10).

12. A mounting as defined by claim 4, which includes:

a transverse shackle (19) that protrudes outwardly from an end face of said socket (13) of said bushing (16), and said transverse shackle (19), is supported on a protuberance (36) on said back side of said reflector (10).

13. A mounting as defined by claim 5, which includes:

a transverse shackle (19) that protrudes outwardly from an end face of said socket (13) of said bushing (16), and said transverse shackle (19), is supported on a protuberance (36) on said back side of said reflector (10).

14. A mounting as defined by claim 6, which includes:

a transverse shackle (19) that protrudes outwardly from an end face of said socket (13) of said bushing (16), and said transverse shackle (19), is supported on a protuberance (36) on said back side of said reflector (10).

15. A mounting as defined by claim 7, which includes:

a transverse shackle (19) that protrudes outwardly from an end face of said socket (13) of said bushing (16), and said transverse shackle (19), is supported on a protuberance (36) on said back side of said reflector (10).

16. A mounting as defined by claim 8, which includes:

a transverse shackle (19) that protrudes outwardly from an end face of said socket (13) of said bushing (16), and said transverse shackle (19), is supported on a protuberance (36) on said back side of said reflector (10).

* * * * *